(12) United States Patent
Shin et al.

(10) Patent No.: US 11,461,013 B2
(45) Date of Patent: Oct. 4, 2022

(54) CONTROLLER, OPERATING METHOD OF THE CONTROLLER AND MEMORY SYSTEM

(71) Applicant: SK hynix Inc., Gyeonggi-do (KR)

(72) Inventors: Hee Chan Shin, Gyeonggi-do (KR); Young Ho Ahn, Gyeonggi-do (KR); Yong Seok Oh, Gyeonggi-do (KR); Do Hyeong Lee, Gyeonggi-do (KR); Jae Gwang Lee, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 0 days.

(21) Appl. No.: 17/036,759

(22) Filed: Sep. 29, 2020

(65) Prior Publication Data

US 2021/0303176 A1   Sep. 30, 2021

(30) Foreign Application Priority Data

Mar. 31, 2020  (KR) .................. 10-2020-0038852

(51) Int. Cl.
 *G06F 3/06* (2006.01)
 *G06F 12/10* (2016.01)
(52) U.S. Cl.
 CPC .......... *G06F 3/0616* (2013.01); *G06F 3/0647* (2013.01); *G06F 3/0688* (2013.01); *G06F 12/10* (2013.01); *G06F 2212/1036* (2013.01)
(58) Field of Classification Search
 CPC ...... G06F 3/0616; G06F 3/0688; G06F 12/10; G06F 2212/1036; G06F 3/0647

USPC ........................................................ 711/102
See application file for complete search history.

(56) References Cited

U.S. PATENT DOCUMENTS

| | | | | |
|---|---|---|---|---|
| 2009/0248962 | A1* | 10/2009 | Kim | G06F 12/0246<br>711/E12.001 |
| 2016/0371019 | A1* | 12/2016 | Kang | G06F 3/0679 |
| 2017/0003892 | A1* | 1/2017 | Sekido | G06F 3/0608 |
| 2017/0262377 | A1* | 9/2017 | Yoshii | G06F 3/0659 |

FOREIGN PATENT DOCUMENTS

KR   10-2016-0150451   12/2016

* cited by examiner

*Primary Examiner* — Hua J Song
(74) *Attorney, Agent, or Firm* — IP & T Group LLP

(57) ABSTRACT

A memory system includes: a plurality of memory devices; a plurality of cores suitable for controlling the plurality of memory devices, respectively; and a controller including: a host interface layer for providing any one of the cores with a request of a host based on mapping between logical addresses and the cores, a remap manager for changing the mapping between the logical addresses and the cores in response to a trigger, a data swapper for swapping data between the plurality of memory devices based on the changed mapping, and a state manager for determining a state of the memory system depending on whether the data swapper is swapping the data or has completed swapping the data, and providing the remap manager with the trigger based on the state of the memory system and a difference in a degree of wear between the plurality of memory devices.

17 Claims, 10 Drawing Sheets

| | DEVICE1 | DEVICE2 | DEVICE3 | DEVICE4 | |
|---|---|---|---|---|---|
| WINDOW EC | 3 | 5 | 2 | 1 | |
| | 3 | 6 | 1 | 0 | SUM |
| | 2 | 8 | 0 | 0 | |
| | 4 | 5 | 2 | 0 | |

| | DEVICE1 | DEVICE2 | DEVICE3 | DEVICE4 |
|---|---|---|---|---|
| LATEST EC | 12 | 24 | 5 | 1 |

FIG. 7A

| LA | CORE |
|---|---|
| (LA)%4=1 | 1 |
| (LA)%4=2 | 2 |
| (LA)%4=3 | 3 |
| (LA)%4=4 | 4 |

FIRST MAPPING (702)

FIG. 7B

| LA | CORE |
|---|---|
| (LA)%4=2 | 1 |
| (LA)%4=1 | 2 |
| (LA)%4=3 | 3 |
| (LA)%4=4 | 4 |

SECOND MAPPING (704)

FIG. 7C

| LA |
|---|
| CHUNK1 |
| CHUNK2 |
| CHUNK3 |
| CHUNK4 |
| CHUNK5 |

CHUNK1, CHUNK2 } SECOND MAPPING
CHUNK3 } WAIT
CHUNK4, CHUNK5 } FIRST MAPPING

CONTROLLER, OPERATING METHOD OF THE CONTROLLER AND MEMORY SYSTEM

CROSS-REFERENCE TO RELATED APPLICATION(S)

The present application claims priority under 35 U.S.C. § 119(a) to Korean Patent Application No. 10-2020-0038852, filed on Mar. 31, 2020, the disclosure of which is incorporated herein by reference in its entirety.

BACKGROUND

1. Field

Various embodiments of the present disclosure generally relate to a memory system. Particularly, the embodiments relate to a memory system including a memory device and a controller for controlling the memory device.

2. Description of the Related Art

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since they have no moving parts, memory systems provide advantages such as excellent stability and durability, high information access speed, and low power consumption. Examples of memory systems having such advantages include universal serial bus (USB) memory devices, memory cards having various interfaces, and solid state drives (SSD).

SUMMARY

Various embodiments of the present disclosure are directed to a controller and a memory system, which may efficiently balance the degrees of wear of memory devices in the memory system.

In accordance with an embodiment, a memory system includes: a plurality of memory devices; a plurality of cores suitable for controlling the plurality of memory devices, respectively; and a controller including: a host interface layer for providing any one of the cores with a request of a host based on mapping between logical addresses and the cores, a remap manager for changing the mapping between the logical addresses and the cores in response to a trigger, a data swapper for swapping data between the plurality of memory devices based on the changed mapping, and a state manager determining a state of the memory system depending on whether the data swapper is swapping the data or has completed swapping the data, and providing the remap manager with the trigger, based on the state of the memory system and a difference in a degree of wear between the plurality of memory devices.

In accordance with another embodiment, a controller that provides a request of a host to one or more of a plurality of cores controlling respective memory devices, the controller comprising: a host interface layer suitable for providing any one of the cores with the request, based on mapping between logical addresses and the cores; a remap manager suitable for changing the mapping between the logical addresses and the cores in response to a trigger; a data swapper suitable for swapping data between the memory devices, which correspond to the cores based on the changed mapping; and a state manager suitable for determining a state of the controller depending on whether the data swapper is swapping the data or has completed swapping the data, and providing the remap manager with the trigger based on the state of the controller and a difference in a degree of wear between the memory devices.

In accordance with still another embodiment, an operating method of a controller, the operating method includes: assigning, according to a policy, a logical address to one of plural cores to control a corresponding one of plural memory devices to perform a memory operation based on the assigned logical address; changing the policy when a maximum difference among cumulative erase counts of the respective memory devices becomes greater than a threshold; controlling the cores to control the memory devices to move stored data therebetween according to the changed policy to lower the maximum difference; and changing the policy again and repeating the controlling when the maximum difference is still greater than the threshold even a set amount of time after the controlling.

BRIEF DESCRIPTION OF THE DRAWINGS

FIGS. 7A to 7C are diagrams illustrating operations of a remap manager and a data swapper in accordance with an embodiment.

DETAILED DESCRIPTION

Hereinafter, various embodiments of the present disclosure are described below in detail with reference to the accompanying drawings. The following description focuses on subject matter pertinent to the present invention; well-known technical detail may be omitted so as not obscure the subject matter of the disclosed embodiments. Throughout the specification, reference to "an embodiment," "another embodiment" or the like is not necessarily to only one embodiment, and different references to any such phrase are not necessarily to the same embodiment(s).

Figure 1:
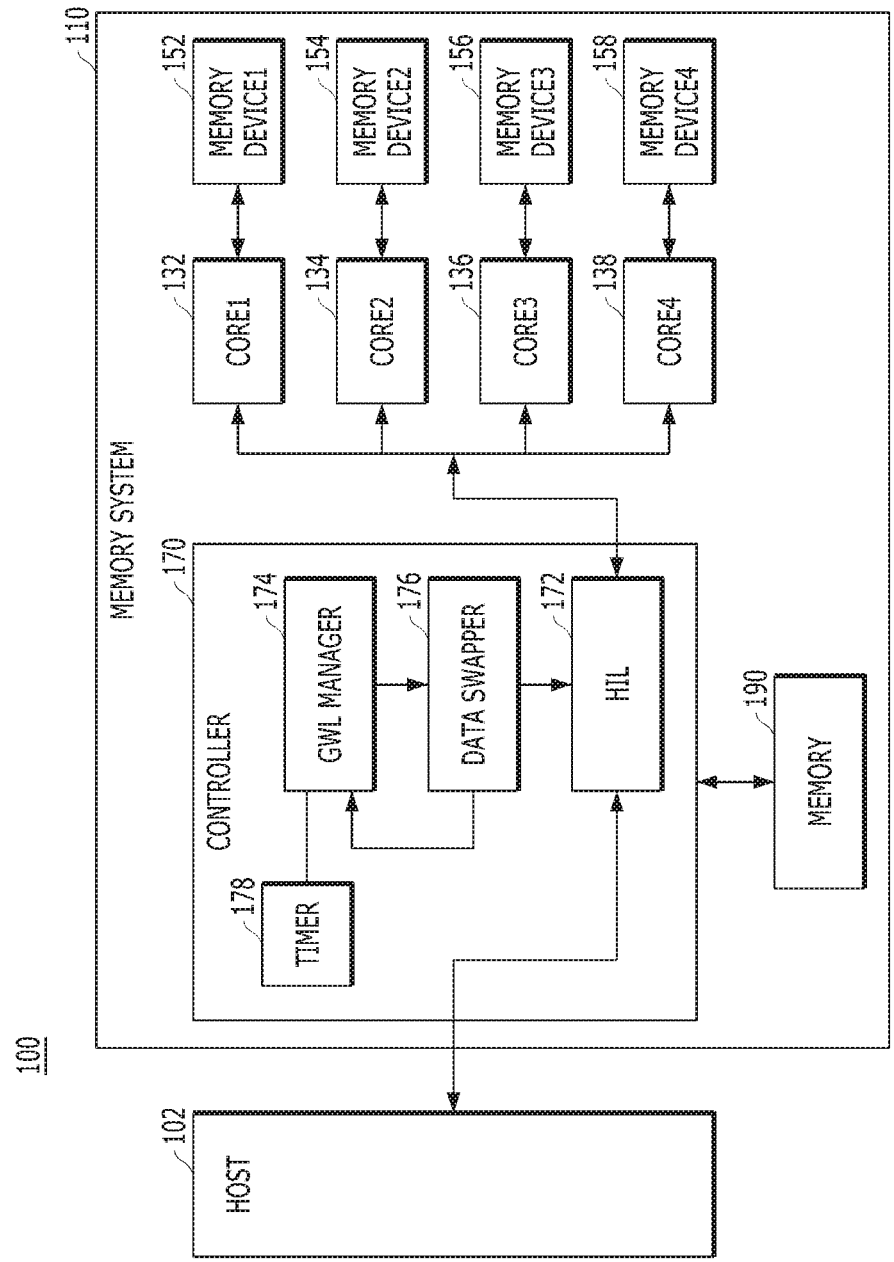
FIG. 1 is a block diagram illustrating a data processing system including a memory system in accordance with an embodiment.

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may include any of various portable electronic devices such as a mobile phone, MP3 player and laptop computer, or any of various non-portable electronic devices such as a desktop computer, a game machine, a television (TV), and a projector.

The host 102 may include at least one operating system (OS), which may manage and control overall functions and operations of the host 102, and provide operation between the host 102 and a user using the data processing system 100 or the memory system 110. The OS may support functions and operations corresponding to the use purpose and usage of a user. For example, the OS may be divided into a general OS and a mobile OS, depending on the mobility of the host 102. The general OS may be divided into a personal OS and an enterprise OS, depending on the environment of a user.

The memory system 110 may operate to store data for the host 102 in response to a request of the host 102. Non-limiting examples of the memory system 110 include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC, and the. The SD card may include a mini-SD card and micro-SD card.

The memory system 110 may be embodied by any of various types of storage devices. Examples of such storage devices include, but are not limited to, volatile memory devices such as a dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM) and a flash memory. The flash memory may have a 3-dimensional (3D) stack structure.

The memory system 110 may include a plurality of memory devices 152, 154, 156 and 158, a plurality of cores 132, 134, 136 and 138, a controller 170 and a memory 190. The memory devices 152, 154, 156 and 158 may store data for the host 102. The cores 132, 134, 136 and 138 may control the data storage of the memory devices 152, 154, 156 and 158, respectively.

The cores 132, 134, 136 and 138 and the memory devices 152, 154, 156 and 158 may be integrated into one semiconductor device. For example, the cores 132, 134, 136 and 138 and the memory devices 152, 154, 156 and 158 may be integrated into one semiconductor device to constitute a solid state drive (SSD). When the memory system 110 is used as the SSD, the operating speed of the host 102 connected to the memory system 110 may be improved. In another embodiment, the cores 132, 134, 136 and 138 and the memory devices 152, 154, 156 and 158 may be integrated into one semiconductor device to constitute a memory card, such as a PC Card (PCMCIA: Personal Computer Memory Card International Association), a compact flash (CF) card, a smart media card (SM or SMC), a memory stick, a multimedia card (MMC) including a reduced size MMC (RS-MMC) and a micro-MMC, a secure digital (SD) card including a mini-SD card, a micro-SD card and a secure digital high capacity (SDHC) card, and/or a universal flash storage (UFS) device.

Each of the memory devices 152, 154, 156 and 158 may be a non-volatile memory device that retains data stored therein even though power is not supplied. The memory devices 152, 154, 156 and 158 may store therein data, which are received from the host 102, through a program operation, and provide the host 102 with data stored therein through a read operation. Each of the memory devices 152, 154, 156 and 158 may include a plurality of memory blocks, each of which may include a plurality of pages, and each of the pages may include a plurality of memory cells coupled to a word line. In an embodiment, each of the memory devices 152, 154, 156 and 158 may be a flash memory. The flash memory may have a 3-dimensional (3D) stack structure.

Figure 2:
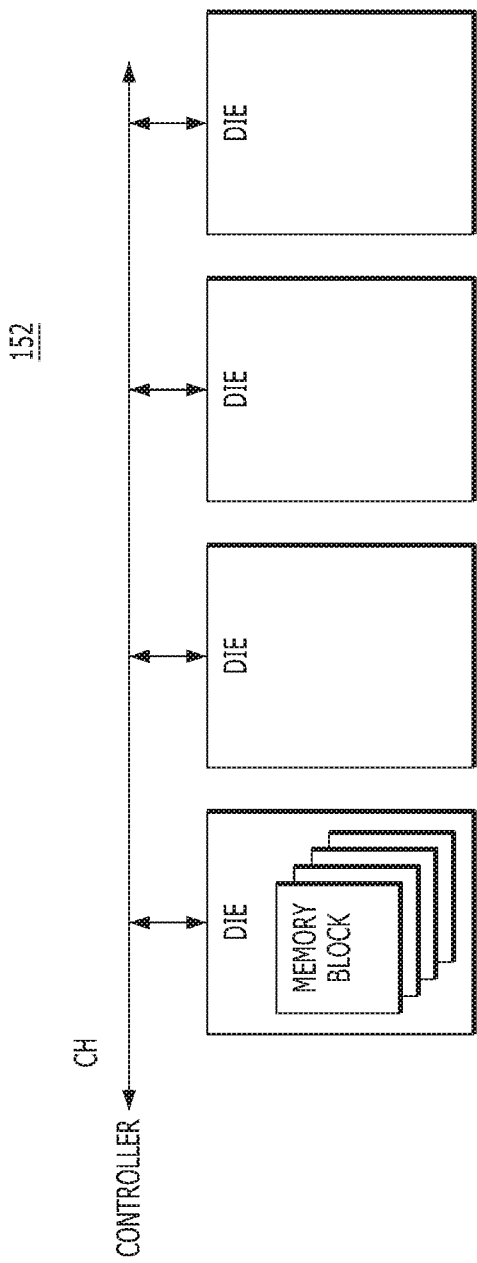
FIG. 2 is a diagram illustrating an example of a memory device.

FIG. 2 is a diagram illustrating an example of the memory device 152.

FIG. 2 representatively illustrates the first memory device 152 of the memory devices 152, 154, 156 and 158 in the memory system 110 of FIG. 1.

The first memory device 152 may include a plurality of memory dies DIEs. For example, each of the memory dies DIEs may be a NAND memory die. The memory dies DIEs may be coupled to the controller 170 through a channel CH.

Each of the memory dies DIEs may have a hierarchical structure of planes, memory blocks and pages. One memory die DIE may receive one command at a time. One memory die DIE may include a plurality of planes, and the plurality of planes may process the command, which is received by the memory die DIE, in parallel. Each of the planes may include a plurality of memory blocks. Each of the memory blocks may be a minimum unit of an erase operation. One memory block may include a plurality of pages. Each of the pages may be a minimum unit of a write operation. The plurality of memory dies DIEs may operate in parallel with one another.

The structure of each of the second to fourth memory devices 154, 156 and 158 may be the same or substantially the same as that of the first memory device 152. The plurality of memory devices 152, 154, 156 and 158 may operate in parallel with one another.

Referring back to FIG. 1, the cores 132, 134, 136 and 138 may be connected to the memory devices 152, 154, 156 and 158 one-to-one. Each of the cores 132, 134, 136 and 138 may control the memory device connected thereto. The cores 132, 134, 136 and 138 may operate in parallel with one another.

The cores 132, 134, 136 and 138 may perform a foreground operation in response to a request of the host 102. For example, the first core 132 may control the first memory device 152 to program data into a memory block of the first memory device 152 in response to a write request of the host 102, and control the first memory device 152 to read data from the memory block of the first memory device 152 in response to a read request of the host 102.

In addition, the cores 132, 134, 136 and 138 may also perform a background operation on the memory devices 152, 154, 156 and 158.

The controller 170 may improve parallel processing performance of the cores 132, 134, 136 and 138 by distributing a request of the host 102 to each of the cores 132, 134, 136 and 138. The request may include logical addresses used by the host 102, for example, logical block addresses LBA. The controller 170 may distribute the request to each of the cores 132, 134, 136 and 138 based on the logical addresses of the request. Since the request of the host 102 is distributed to each of the cores 132, 134, 136 and 138 based on the logical addresses, each of the cores 132, 134, 136 and 138 may process only the request for the logical address.

The memory 190 may serve as an operating memory of the memory system 110, and store data for driving the memory system 110. The cores 132, 134, 136 and 138 may control the memory devices 152, 154, 156 and 158 to perform read, program and erase operations in response to the request of the host 102. The cores 132, 134, 136 and 138 may provide the host 102 with data read from the memory devices 152, 154, 156 and 158, and store data provided by the host 102 in the memory devices 152, 154, 156 and 158. The memory 190 may store therein data for the cores 132, 134, 136 and 138 and the memory devices 152, 154, 156 and 158 to perform the above-described operations.

The memory 190 may be implemented as a volatile memory. For example, the memory 190 may be implemented as a static random access memory (SRAM) or a dynamic random access memory (DRAM). The memory 190 may be disposed within or externally to the controller 170. FIG. 1 exemplifies the memory 190 disposed externally to the controller 170.

The memory blocks in the memory devices 152, 154, 156 and 158 may have limited lifespans. Therefore, when the erase operation is performed on a specific memory block a specific number of times, the memory block may no longer be used. The cores 132, 134, 136 and 138 may perform local wear-leveling operations, as background operations, on the memory devices 152, 154, 156 and 158, respectively. For example, the respective cores 132, 134, 136 and 138 may balance the degrees of wear of the memory blocks in their respective memory devices 152, 154, 156 and 158 by facilitating storage of frequently accessed data in a memory block having a low degree of wear among the memory blocks. When the cores 132, 134, 136 and 138 perform the local wear-leveling operation, the degrees of wear of the memory blocks in each of the memory devices 152, 154, 156 and 158 may be balanced.

The number of requests provided to the respective cores 132, 134, 136 and 138 may vary depending on which logical addresses are associated with the requests provided from the host 102. When the number of requests provided to the cores 132, 134, 136 and 138 are not balanced, the memory blocks among the memory devices 152, 154, 156 and 158 may not be worn evenly. Even though the cores 132, 134, 136 and 138 perform the local wear-leveling operation, it is difficult to balance the degree of wear of the memory blocks between the memory devices 152, 154, 156 and 158. When memory blocks of a specific memory device reach the end of their lifespans earlier than memory blocks of other memory devices, the entire memory system 110 may not be normally used since the memory blocks of the other memory devices are still available.

According to an embodiment of the present disclosure, the controller 170 may change the mapping between the logical addresses and each of the cores 132, 134, 136 and 138 based on the difference in the degree of wear between the memory devices 152, 154, 156 and 158, and perform a global wear-leveling operation of exchanging data between the memory devices 152, 154, 156 and 158 according to the changed mapping.

The controller 170 may include a host interface layer 172, a global wear-leveling (GWL) manager 174 and a data swapper 176. The controller 170 may further include a timer 178 for periodically controlling the global wear-leveling manager 174.

The host interface layer 172 may provide any one of the cores 132, 134, 136 and 138 with a request of the host 102 based on the mapping between the logical addresses and the cores 132, 134, 136 and 138. For example, the host interface layer 172 may distribute the request to each of the cores 132, 134, 136 and 138 according to a result obtained by performing a modulo operation on the logical addresses of the request, but the method of distributing the request is not limited thereto.

The global wear-leveling manager 174 may monitor the degree of wear of the memory devices 152, 154, 156 and 158, and change the mapping between the logical addresses and the cores 132, 134, 136 and 138 based on the difference in the degree of wear between the memory devices 152, 154, 156 and 158. For example, the global wear-leveling manager 174 may change the mapping between the logical addresses and the cores 132, 134, 136 and 138 so that a request for a first logical address which has been provided to the first core 132 is now provided to the second core 134, and a request for a second logical address which has been provided to the second core 134 is now provided to the first core 132, in order to alleviate the difference in the degree of wear between the first memory device 152 and the second memory device 154.

The data swapper 176 may move the data stored in each of the memory devices 152, 154, 156 and 158 according to the changed mapping between the logical addresses and each of the cores 132, 134, 136 and 138. For example, the data swapper 176 may move data for the first logical address stored in the first memory device 152 to the second memory device 154, and move data for the first logical address stored in the second memory device 154 to the first memory device 152.

The timer 178 may periodically call an operation of the global wear-leveling manager 174.

Figure 3:
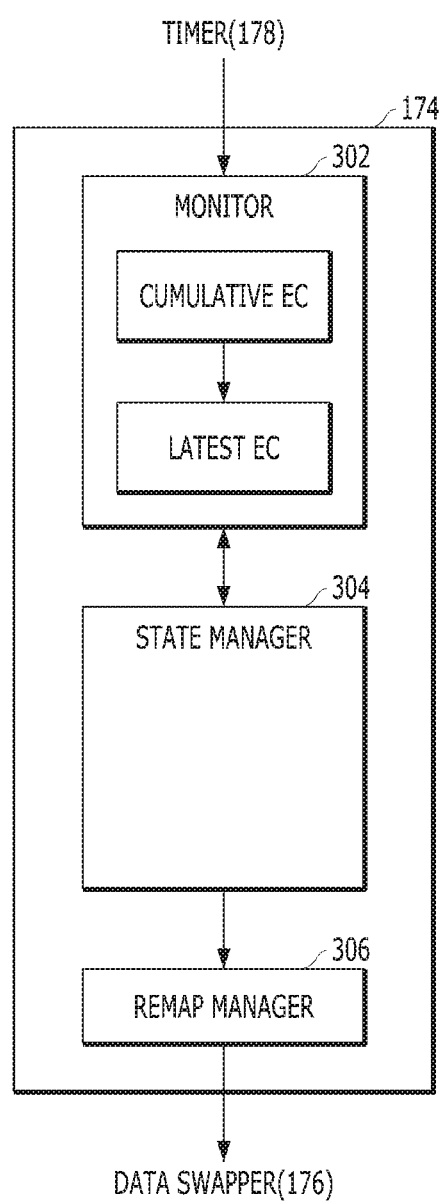
FIG. 3 is a block diagram illustrating a global wear-leveling manager in accordance with an embodiment.

FIG. 3 is a block diagram illustrating the global wear-leveling manager 174 in accordance with an embodiment.

The global wear-leveling manager 174 may include a monitor 302, a state manager 304 and a remap manager 306.

The monitor 302 may monitor the degree of wear of each of the memory devices 152, 154, 156 and 158. According to an embodiment, the monitor 302 may determine the degree of wear of a corresponding memory device and the rate of increase in the degree of wear based on an erase count of each of the memory blocks in each of the memory devices 152, 154, 156 and 158. The operation of determining, by the monitor 302, the degree of wear of each of the memory devices 152, 154, 156 and 158 and the rate of increase in the degree of wear may be periodically performed in response to the call of the timer 178. An example of the operation of the monitor 302 is described below with reference to FIGS. 4A to 4C.

The state manager 304 may trigger the global wear-leveling operation under different conditions according to the state of the memory system 110. For example, the state manager 304 may determine the state of the memory system 110 according to whether a data swap operation of the data swapper 176 is being performed or is completely performed. The state manager 304 may activate or deactivate the operation of the monitor 302 according to the determined state, and when the monitor 302 is activated, the state manager 304 may control the remap manager 306 to change the mapping between the logical addresses and each of the cores 132, 134, 136 and 138, based on the difference in the degree of wear between the memory devices 152, 154, 156 and 158. The state manager 304 may use different conditions for triggering the global wear-leveling operation for different states of the memory system 110, thereby preventing the global wear-leveling operation from being performed unnecessarily frequently. When the global wear-leveling operation is performed at the right time under the control of the state manager 304, the performance and lifespan of the memory system 110 may be improved. An example of the operation of the state manager 304 is described below with reference to FIGS. 5 and 6A to 6C.

The remap manager 306 may change the mapping between the logical addresses and each of the cores 132, 134, 136 and 138, in response to the control of the state manager 304. For example, the remap manager 306 may swap a logical address mapped to a core that controls a memory device having the lowest degree of wear, for a logical address mapped to a core that controls a memory device having the fastest increase in degree of wear over a recent period of time. For example, the recent period of time may be some latest time windows. The remap manager 306 may control the data swapper 176 to swap the data of the memory devices 152, 154, 156 and 158 according to the mapping between the logical addresses and the cores 132, 134, 136 and 138. Examples of the operations of the remap manager 306 and the data swapper 176 are described below with reference to FIGS. 7A to 7C.

Figure 4A:
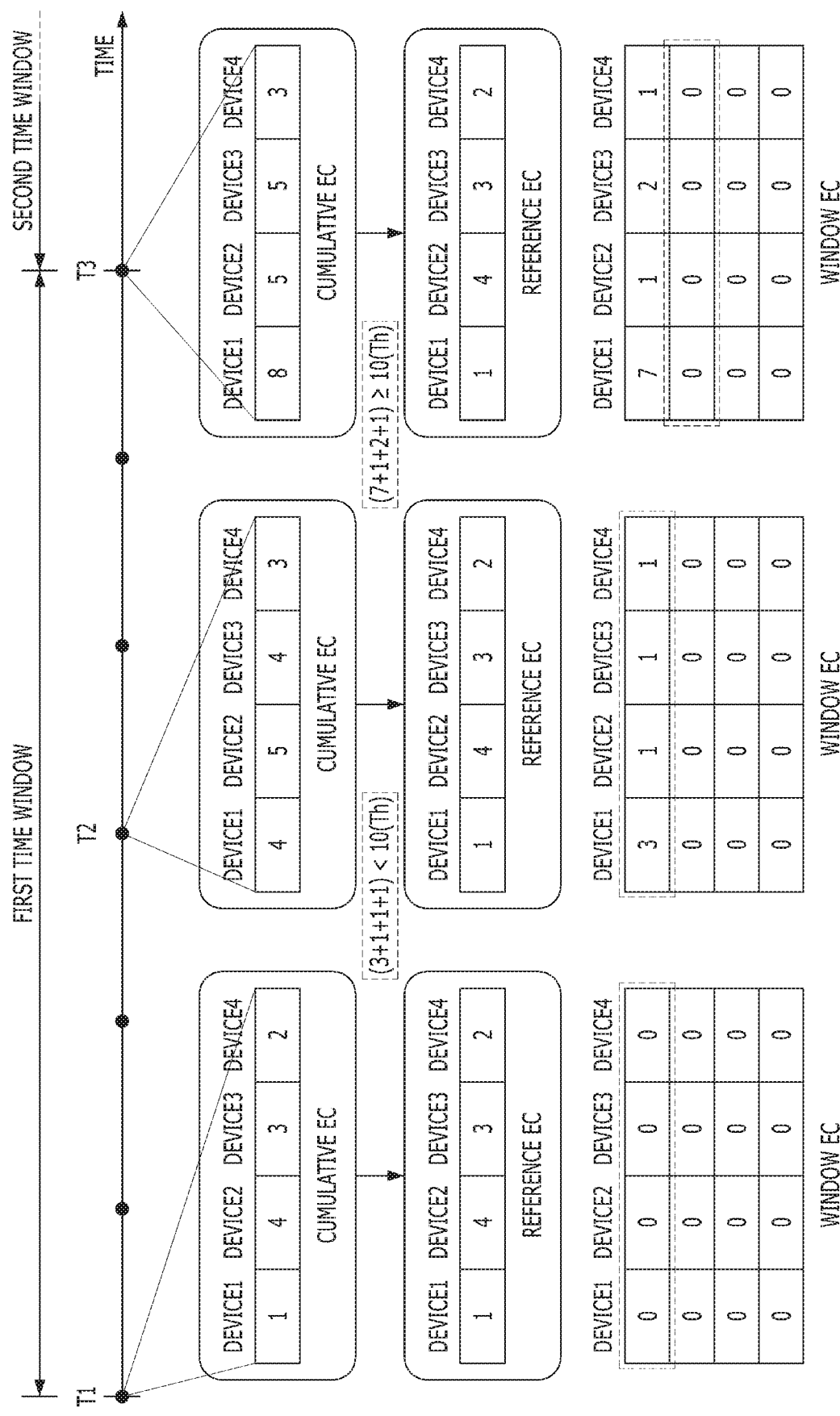
FIGS. 4A to 4C are diagrams illustrating an operation of a monitor in accordance with an embodiment.
Figures 4B, 4C:
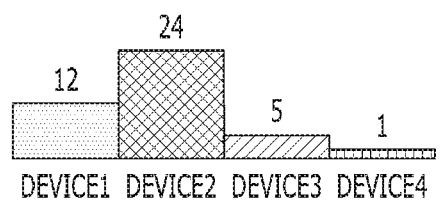

FIGS. 4A to 4C are diagrams illustrating the operation of the monitor 302 in accordance with an embodiment.

FIG. 4A illustrates a change in an erase count of memory blocks in each memory device over time.

The monitor 302 may periodically determine the degree of wear of each memory device under the control of the timer 178. Time points at which the monitor 302 determines the degree of wear are displayed on a time axis TIME of FIG. 4A. FIG. 4A exemplifies the erase counts of the memory blocks at a first time point T1, a second time point T2, and a third time point T3 among the time points. The erase count may include a cumulative erase count, a reference erase count and a window erase count.

The cumulative erase count for each memory device may be determined by summing up erase counts of the memory blocks in that memory device. The erase count of each of the memory blocks may be counted by the core that controls the memory device in which the corresponding memory block resides. The core may store the erase count of each of the memory blocks in the memory 190. The monitor 302 may determine the degree of wear for each memory device based on the cumulative erase count for the corresponding memory device.

The window erase count for each memory device may be determined by summing up an increase number of erase counts of the memory blocks in the corresponding memory device within a set time range. Hereinafter, the set time range is referred to as a time window. The time window may be reset whenever the erase count of the entire memory system reaches a specific number. For example, the monitor 302 may define a new time window when the sum of the window erase counts of the memory devices in a specific time window is equal to or greater than a threshold value. FIG. 4A exemplifies a plurality of window erase counts for different time windows. The monitor 302 may determine the rate of increase in the degree of wear for each memory device based on an erase count in at least one window for each memory device.

The reference erase count may represent a cumulative erase count when the time window is reset. The monitor 302 may determine the window erase count by subtracting the reference erase count from a current cumulative erase count.

Hereinafter, the cumulative erase count, the reference erase count and the window erase count are described with reference to the example of FIG. 4A. FIG. 4A illustrates a case where the first time point T1 is a start point of a first time window. At the first time point T1, the monitor 302 may determine the cumulative erase count for each memory device as the reference erase count for that memory device. Among the plurality of window erase counts illustrated in FIG. 4A, an erase count surrounded by a broken line represents a first window erase count in the first time window, which is a current time window. Since the first time point T1 is the start point of the time window, the window erase count for each memory device may be initialized to (0, 0, 0, 0).

The monitor 302 may update the cumulative erase count and the window erase count according to the call of the timer 178 after the first time point T1. FIG. 4A exemplifies the cumulative erase count, the reference erase count and the window erase count at the second time point T2. The reference erase count at the second time point T2 may be equal to the reference erase count at the first time point T1. The cumulative erase count at the second time point T2 may increase as the erase operation is performed on the memory blocks of the memory devices after the first time point T1. The window erase count (3, 1, 1, 1) at the second time point T2 may be determined by a difference between the cumulative erase count (4, 5, 4, 3) and the reference erase count (1, 4, 3, 2).

The monitor 302 may determine whether to reset the time window based on the updated window erase count. The monitor 302 may not reset the time window when the sum of the window erase counts of the memory devices in a specific time window is less than the threshold value. FIG. 4A exemplifies that the monitor 302 does not reset the time window because the sum (3+1+1+1) of the first window erase count at the second time point T2 is determined to be less than the threshold value of "10".

FIG. 4A exemplifies the cumulative erase count, the reference erase count and the window erase count at the third time point T3. The reference erase count at the third time point T3 may be equal to the reference erase count at the first time point T1. The cumulative erase count at the third time point T3 may increase as the erase operation is performed on the memory blocks of the memory devices after the second time point T2. The window erase count (7, 1, 2, 1) at the third time point T3 may be determined by a difference between the cumulative erase count (8, 5, 5, 3) and the reference erase count (1, 4, 3, 2).

The monitor 302 may determine whether to reset the time window based on the updated window erase count. FIG. 4A exemplifies that the monitor 302 resets the time window because the sum (7+1+2+1) of the first window erase count at the third time point T3 is determined to be equal to or greater than the threshold value of "10".

The monitor 302 may update the reference erase count and newly count the window erase count while resetting the first time window to a second time window. In the example of FIG. 4A, the monitor 302 may update the reference erase count to the erase count (8, 5, 5, 3) at the third time T3. At the third time point T3, an erase count surrounded by a broken line among the plurality of window erase counts represents a second window erase count in the second time window. The second window erase count for each memory device may be initialized to (0, 0, 0, 0). According to an embodiment, the monitor 302 may store a set number of window erase counts in the memory 190. In the example of FIG. 4A, the monitor 302 may store the latest four window erase counts in the memory 190. The monitor 302 may keep the first window erase count in the memory 190 even after the third time point T3, which is a start point of the second time window.

FIG. 4B illustrates the latest erase count of memory blocks included in each memory device.

The monitor 302 may determine the latest erase count for each memory device based on at least one window erase count. For example, the monitor 302 may determine the sum of a plurality of window erase counts (e.g., 4 window erase counts as exemplified in FIG. 4B) for each memory device, which are stored in the memory 190, as the latest erase count for the corresponding memory device. The monitor 302 may determine the latest rate of increase in the degree of wear for each memory device based on the latest erase count for the corresponding memory device.

FIG. 4C exemplifies the rate of increase in the degree of wear for each memory device based on the latest erase count for each memory device.

The monitor 302 may determine that as the latest erase count of a memory device increases, the rate of increase in the degree of wear of the memory device is high. The more requests received from the host 102 in a specific core, the more times the erase operation of a memory device controlled by the specific core may be performed. Therefore, it may be determined that a core that controls a memory device having a high rate of increase in the degree of wear has recently received the highest number of requests from the host 102.

Figure 5:
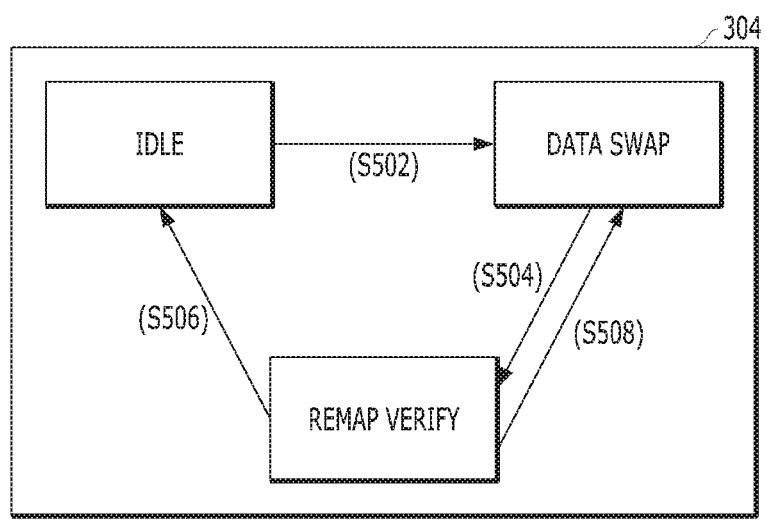
FIG. 5 exemplifies a state manager in accordance with an embodiment.

FIG. 5 exemplifies the state manager 304 in accordance with an embodiment.

The state manager 304 may control the remap manager 306 on different criterion according to a plurality of states of the memory system 110.

The plurality of states may include a data swap state, a remap verification state and an idle state.

The data swap state refers to a state in which the data swapper 176 swaps data between memory devices. The remap verification state refers to a state in which the monitor 302 verifies whether a difference in the degree of wear between the memory devices is alleviated after the data swap operation is completely performed. The idle state refers to a state excluding the data swap state and the remap verification state.

The operations of the state manager 304 according to the plurality of states are described with reference to FIG. 5.

An initial state of the memory system 110 may be the idle state. In the idle state, the state manager 304 may control the monitor 302 to monitor the difference in the degrees of wear among the memory devices. The state manager 304 may control the remap manager 306 to change the mapping between the logical addresses and the cores, when the monitoring result of the monitor 302 indicates that the difference in the degree of wear between the memory devices is equal to or greater than a trigger threshold value.

The data swapper 176 may control the plurality of cores to swap data between the memory devices based on the changed mapping between the logical addresses and the cores. In step S502, the state manager 304 may change a current state from the idle state to the data swap state.

In the data swap state, the state manager 304 may deactivate the monitor 302. Even when the monitor 302 is in an inactive state, the cumulative erase count for each memory block may be counted by its associated core. However, in the inactive state, the monitor 302 may not determine whether the difference in the degree of wear between the memory devices is equal to or greater than the threshold value. The state manager 304 may deactivate the monitor 302, thereby preventing the data swap operation from being triggered again, regardless of the difference in the degree of wear between the memory devices during the data swap operation.

When the data swap operation is completely performed, the state manager 304 may change the current state from the data swap state to the remap verification state in step S504. In the remap verification state, the state manager 304 may activate the monitor 302. The activated monitor 302 may monitor the difference in the degree of wear between the memory devices. In the remap verification state, the state manager 304 may verify whether the difference in the degree of wear between the memory devices has been alleviated according to a change in the mapping between logical addresses and the cores. The state manager 304 may change the remap verification state to the idle state in step S506, when it is determined as the result of the verification that the difference in the degree of wear between the memory devices has been alleviated. When it is determined as the result of the verification that the difference in the degree of wear between the memory devices has not been alleviated, the state manager 304 may change the remap verification state to the data swap state in step S508, and control the remap manager 306 to change again the mapping between the logical addresses and the cores. A remap verification operation of the state manager 304 is described below with reference to FIGS. 6A to 6C.

Figure 6A:
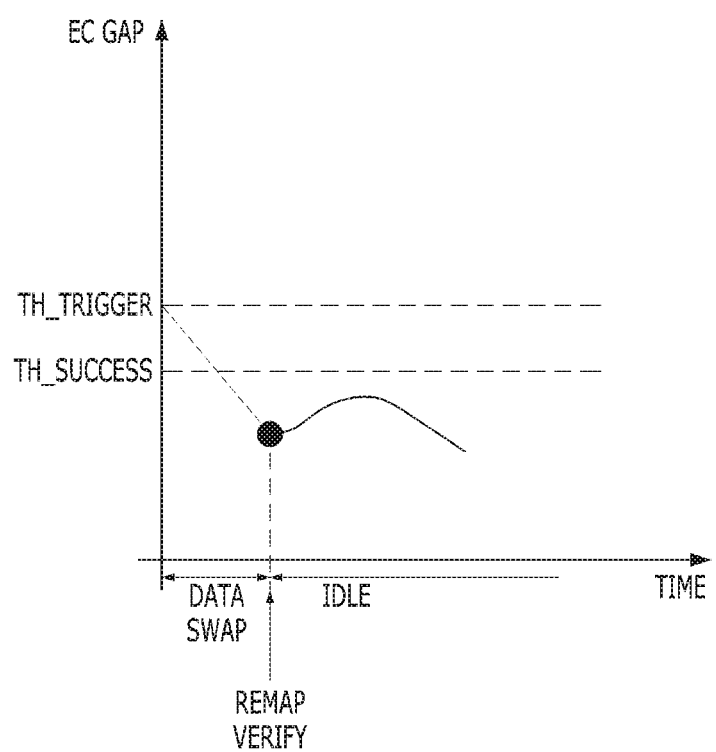
FIGS. 6A to 6C are diagrams illustrating a remap verification operation of a state manager.
Figure 6B:
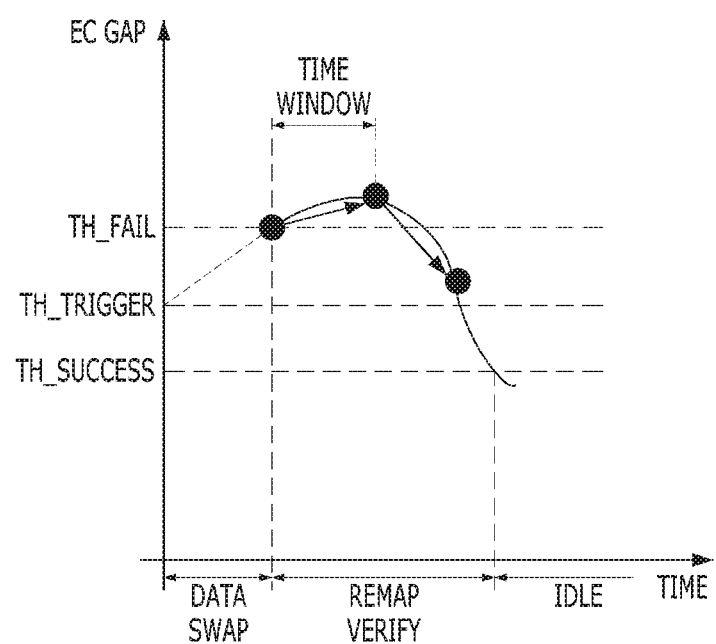
Figure 6C:
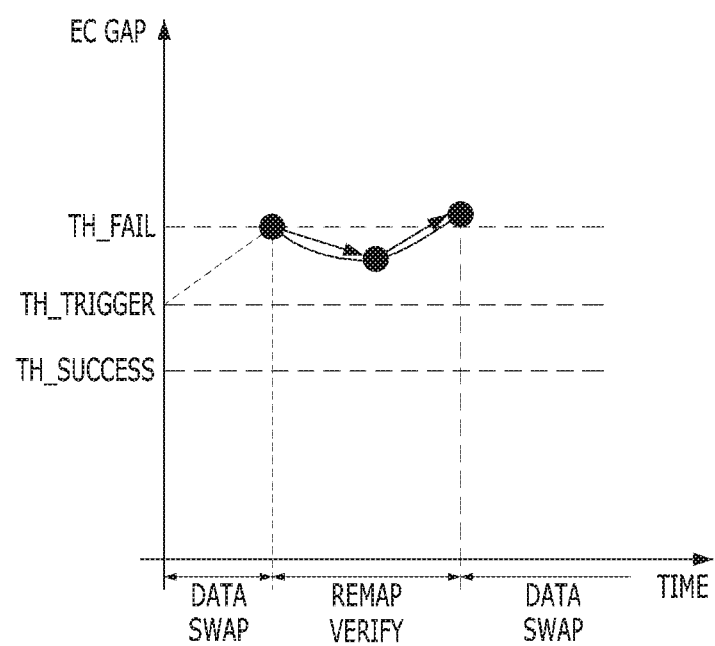

FIGS. 6A to 6C are diagrams illustrating the remap verification operation of the state manager 304.

FIGS. 6A to 6C are graphs illustrating a difference EC GAP in cumulative erase counts between memory devices with respect to time TIME.

The cumulative erase counts are illustrated as an example of the degree of wear of a memory device. The difference EC GAP in the cumulative erase counts between the memory devices may be determined by a difference between a maximum value and a minimum value of the cumulative erase count for each memory device.

FIG. 6A illustrates a first example in which the remap verification state is changed to the idle state as a result of the remap verification operation.

The monitor 302 may not monitor the difference in the erase counts in the data swap state. In a time period in which the difference in the erase counts is not monitored, the erase counts are represented by a dotted line.

When the data swap operation is completely performed, the state manager 304 may change the data swap state to the remap verification state, and activate the monitor 302. When the monitor 302 is activated, the state manager 304 may obtain the difference in erase counts between the memory devices. For example, the state manager 304 may determine the difference in erase counts by subtracting the lowest erase count from the highest erase count. The state manager 304 may determine whether the difference in the degree of wear between the memory devices has been alleviated, based on the difference in the erase counts.

When the difference in the erase counts is less than a success threshold value TH_SUCCESS, the state manager 304 may determine that the difference in the degree of wear between the memory devices is alleviated according to a change in the mapping between the logical addresses and the cores, and change the data swap state to the idle state. The success threshold value TH_SUCCESS may be a criterion for determining whether the difference in the degree of wear between the memory devices has been successfully alleviated according to the change in the mapping between the logical addresses and the cores. When the data swap state is changed to the idle state, the state manager 304 may perform the data swap operation when the difference in the erase counts becomes equal to or greater than a trigger threshold value TH_TRIGGER. The trigger threshold value TH_TRIGGER may be a criterion for triggering, by the state manager 304, the global wear-leveling operation in the idle state.

The trigger threshold value TH_TRIGGER and the success threshold value TH_SUCCESS may be different. For example, the success threshold value TH_SUCCESS may be set to be lower than the trigger threshold value TH_TRIGGER as illustrated in FIG. 6A.

FIG. 6B illustrates a second example in which the remap verification state is changed to the idle state as a result of the remap verification operation.

As described with reference to FIG. 6A, when the data swap operation is completely performed, the state manager 304 may change the data swap state to the remap verification state, and determine whether the difference in the degree of wear between the memory devices has been alleviated, based on the difference in the erase counts from the monitor 302.

When the difference of the erase counts is equal to or greater than the success threshold value TH_SUCCESS, the state manager 304 may determine that the difference in the degree of wear between the memory devices has not been alleviated. FIG. 6B exemplifies a case in which the difference in the erase counts immediately after the data swap operation is completely performed is equal to or greater than the success threshold value TH_SUCCESS.

When a sufficient time passes after the data swap operation, and a plurality of requests from the host 102 are processed based on the changed address mapping between the logical addresses and the cores, the difference in the degree of wear between the memory devices may be alleviated. However, immediately after the data swap operation is performed, the difference in the degree of wear between the memory devices may not be sufficiently alleviated, or may increase further than before the data swap operation is performed.

According to an embodiment, even though the difference in the degree of wear between the memory devices immediately after the data swap operation is completely performed is equal to or greater than the trigger threshold value TH_TRIGGER, the state manager 304 may not trigger the data swap operation again until the difference in the degree of wear decreases to less than the success threshold value TH_SUCCESS when a specific condition is satisfied.

In the example of FIG. 6B, when a value representing the difference in the degree of wear immediately after the data swap operation is completely performed exceeds the success threshold value TH_SUCCESS, the state manager 304 may determine, as a fail threshold value TH_FAIL, a value of difference in the degree of wear immediately after the data swap operation is completely performed. The fail threshold value TH_FAIL may be a criterion for determining whether the difference in the degree of wear between the memory devices was not alleviated according to the change in the mapping between the logical addresses and the cores. The state manager 304 may determine whether the difference in the degree of wear between the memory devices even after a certain number of time windows is equal to or greater than the fail threshold value TH_FAIL.

In the example of FIG. 6B, when the difference in the degree of wear between the memory devices after two time windows becomes less than the fail threshold value TH_FAIL, the state manager 304 may not trigger the data swap operation even though the difference in the degree of wear between the memory devices is equal to or greater than the trigger threshold value TH_TRIGGER. The state manager 304 may change the state of the memory system 110 from the remap verification state to the idle state when the difference in the degree of wear between the memory devices is thereafter alleviated and becomes less than the success threshold value TH_SUCCESS.

FIG. 6C illustrates a third example in which the remap verification state is changed to the data swap state as a result of the remap verification operation.

As described with reference to FIG. 6B, the state manager 304 may not change the mapping between the logical addresses and the cores in the remap verification state even though the value of difference in the degree of wear exceeds the trigger threshold value TH_TRIGGER. In the example of FIG. 6C, the state manager 304 may determine whether the difference in the degree of wear between the memory devices after two time windows is equal to or greater than the fail threshold value TH_FAIL When the difference in the degree of wear between the memory devices is equal to or greater than the fail threshold value TH_FAIL even after two time windows, the state manager 304 may determine that the difference in the degree of wear has not been balanced even though the mapping between the logical addresses and the cores has been changed. The state manager 304 may control the remap manager 306 to change the mapping between logical addresses and the cores again. When the remap manager 306 changes the mapping between the logical addresses and the cores, the data swapper 176 may swap data between the memory devices according to the changed mapping.

According to an embodiment, it is possible to determine whether to change the mapping between logical addresses and the cores by reflecting the tendency in which the degrees of wear of the memory devices is balanced immediately after the data swap operation is performed. That is, the state manager 304 may perform the global wear-leveling operation by applying different conditions according to the state of the memory system 110, thereby preventing performance degradation in the memory system 110 due to frequent global wear-leveling operations.

FIGS. 7A to 7C are diagrams illustrating operations of the remap manager 306 and the data swapper 176 in accordance with an embodiment.

FIG. 7A illustrates first mapping 702 before the mapping between the logical addresses and each of the cores is changed.

According to an embodiment, the host interface layer 172 may perform a modulo operation ("(LA) % 4") on logical addresses included in a request of the host 102 by the number of cores (e.g., four cores), and distribute the request to the cores according to a result of the modulo operation. For example, according to the first mapping 702, when the result of the modulo operation on logical addresses included in a specific request is "1", the host interface layer 172 may provide the first core 132 with the corresponding request. The first core 132 may access the first memory device 152 based on the request.

FIG. 7B illustrates second mapping 704 after the mapping between the logical addresses and each of the cores is changed.

The remap manager 306 may change the mapping between the logical addresses and the cores when the difference in the degree of wear between the memory devices satisfies a specific condition, under the control of the state manager 304. For example, the remap manager 306 may swap a logical address mapped to a core that controls a memory device having the lowest cumulative degree of wear, for a logical address mapped to a core that controls a memory device having the highest degree of wear over a recent period of time. The memory device having the highest degree of wear recently may be a memory device in which the most requests of the host 102 have been recently processed over a recent period of time. Accordingly, according to the swapping of the remap manager 306, the memory device having the lowest cumulative degree of wear receives the largest number of requests from the host 102, so that the degrees of wear of the memory devices may be balanced.

FIG. 7B exemplifies a case where logical addresses mapped to a first core and logical addresses mapped to a second core are swapped. For example, according to the second mapping 704, when a result of the modulo operation on logical addresses included in a specific request is "1", the host interface layer 172 may provide the second core 134 with the corresponding request. The second core 134 may access the second memory device 154 based on the request.

When the mapping between the logical addresses and each of the cores is changed from the first mapping 702 to the second mapping 704, the data swapper 176 may swap stored data between the first memory device 152 and the second memory device 154. For example, the data swapper 176 may move data for the logical addresses having the result of the modulo operation of "1", which has been stored in the first memory device 152, to the second memory device 154. For example, the data swapper 176 may control the first core 132 to read the data from the first memory device 152, When the data read from the first memory device 152 is stored in the memory 190, the data swapper 176 may control the second core 134 to store the data in the second memory device 154. Likewise, the data swapper 176 may move data for logical addresses having the result of the modulo operation of "2", which has been stored in the second memory device 154, to the first memory device 152.

According to an embodiment, the data swapper 176 may perform the data swap operation in a logical address order.

FIG. 7C is a diagram illustrating a method of mapping between the logical addresses and each of the cores during the data swap operation.

A plurality of logical addresses may be grouped into equally sized chunks or units. FIG. 7C exemplifies a plurality of chunks arranged in the logical address order.

The data swapper 176 may perform the data swap operation for the logical addresses in units of chunks. For example, data associated with logical addresses of a first chunk may be divided and stored in the plurality of memory devices 152, 154, 156 and 158. When the mapping between the logical addresses and the cores is changed from the first mapping 702 to the second mapping 704, the data swapper 176 may swap data, stored in the first memory device 152 among the data associated with the logical addresses of the first chunk, for data stored in the second memory device 154. When the data swap operation is completely performed on the first chunk, the data swapper 176 may perform the data swap operation on a second chunk.

When the host interface layer 172 receives a request from the host 102 while the data swap operation is being performed, the host interface layer 172 may provide any one of the cores 132, 134, 136 and 138 with the request, based on the first mapping 702 or the second mapping 704 according to a result obtained by comparing logical addresses of the request with logical addresses of the data on which the data swap operation is currently performed.

FIG. 7C exemplifies a case in which the data swap operation is completely performed for logical addresses within the first and second chunks among the plurality of chunks, the data swap operation is being performed for logical addresses within a third chunk, and the data swap operation is not yet performed for logical addresses within fourth and fifth chunks.

When the host interface layer 172 receives a request including logical addresses included in the first to second chunks, the host interface layer 172 may provide any one of the cores 132, 134, 136 and 138 with the request, based on the second mapping 704, When the host interface layer 172 receives a request along with logical addresses included in the third chunk, the host interface layer 172 may wait until the data swap operation is completely performed for the logical addresses within the third chunk, and then provide any one of the cores 132, 134, 136 and 138 with the request, based on the second mapping 704. When the host interface layer 172 receives a request along with logical addresses included in the fourth and fifth chunks, the host interface layer 172 may provide any one of the cores 132, 134, 136 and 138 with the request, based on the first mapping 704.

According to embodiments of the present disclosure described above with reference to FIGS. 1 to 7C, the memory system 110 may include the plurality of memory devices 152, 154, 156 and 158, the plurality of cores 132, 134, 136 and 138 that control the memory devices 152, 154, 156 and 158, respectively, and the controller 170 that provides the cores 132, 134, 136 and 138 with requests of the host 102, based on logical addresses.

The controller 170 may include the host interface layer 172 that provides any one of the cores 132, 134, 136 and 138 with the requests, based on the mapping between the logical addresses and each of the cores, the monitor 302 that monitors the degrees of wear of the memory devices 152, 154, 156 and 158, the state manager 304 that triggers the global wear-leveling operation based on the plurality of states of the memory system 110 and the difference in the degree of wear between the memory devices 152, 154, 156 and 158, and the remap manager 306 that changes the mapping between the logical addresses and the cores depending on whether the global wear-leveling operation is triggered. The controller 170 may further include the data swapper 176 that swaps the data between the memory devices based on the mapping changed by the remap manager 306.

According to embodiments of the present disclosure, the state manager 304 may trigger the global wear-leveling operation under different conditions according to the plurality of states of the memory system 110 such as the data swap state, the remap verification state and the idle state. For example, the state manager 304 may not trigger the data swap operation again while the data swap operation being performed, or trigger the data swap operation under the condition that the difference in the degree of wear between the memory devices increases within a set time range after the data swap operation is completely performed, thereby preventing data from being unnecessarily frequently swapped between the memory devices as the global wear-leveling operation is frequently triggered. Accordingly, the memory system 110 according to embodiments of the present disclosure may improve the lifespan of the memory system 110 by balancing the degrees of wear of the internal memory devices while minimizing performance degradation.

According to embodiments of the present disclosure, it is possible to provide a controller and a memory system which may efficiently balance the degrees of wear of memory devices in the memory system.

While the present invention has been illustrated and described with respect to specific embodiments, it will be apparent to those skilled in the art in light of the present disclosure that various changes and modifications may be made without departing from the spirit and scope of the invention as defined in the following claims.

What is claimed is:

1. A memory system comprising:
   a plurality of memory devices;
   a plurality of cores suitable for controlling the plurality of memory devices, respectively; and
   a controller including:
   a host interface layer for providing any one of the cores with a request of a host based on mapping between logical addresses and the cores,
   a remap manager for changing the mapping between the logical addresses and the cores in response to a trigger,
   a data swapper for swapping data between the plurality of memory devices based on the changed mapping, and
   a state manager for determining a state of the memory system depending on whether the data swapper is swapping the data or has completed swapping the data, and providing the remap manager with the trigger based on the state of the memory system and a difference in a degree of wear between the plurality of memory devices, wherein the state manager determines the state of the memory system as a remap verification state when the data swapper completes the swapping of the data, and provides the remap manager with the trigger when the difference in the degree of wear increases within a set time range of the remap verification state.

2. The memory system of claim 1, wherein the state manager provides the remap manager with the trigger when the difference in the degree of wear is equal to or greater than a trigger threshold value in an idle state of the memory system.

3. The memory system of claim 2, wherein the state manager changes the remap verification state to the idle state when the difference in the degree of wear is less than a success threshold value, which is lower than the trigger threshold value, in the remap verification state.

4. The memory system of claim 1,
   wherein the controller further includes a monitor for monitoring the degrees of wear of the respective memory devices, and
   wherein the state manager determines the state of the memory system as a data swap state while the data swapper is swapping the data, deactivates the monitor in the data swap state, and activates the monitor in the remap verification state.

5. The memory system of claim 1, wherein the difference in the degree of wear is a difference in the degree of wear between a memory device having the highest degree of wear and a memory device having the lowest degree of wear among the plurality of memory devices.

6. The memory system of claim 1, wherein the remap manager changes the mapping between the logical addresses and each of the cores by swapping a logical address mapped to a core that controls a memory device having the lowest degree of wear, among the plurality of memory devices, for a logical address mapped to a core that controls a memory device having the highest rate of increase in the degree of wear among the plurality of memory devices.

7. The memory system of claim 1,
   wherein the data swapper swaps the data in a logical address order of the data, and
   wherein the host interface layer provides any one of the cores with the request based on the mapping after or before the changing by comparing a logical address included in the request with the logical address corresponding to the data that the data swapper is currently swapping.

8. A memory system comprising:
   a plurality of memory devices;
   a plurality of cores suitable for controlling the plurality of memory devices, respectively; and
   a controller including:
   a host interface layer for providing any one of the cores with a request of a host based on mapping between logical addresses and the cores,
   a remap manager for changing the mapping between the logical addresses and the cores in response to a trigger,
   a data swapper for swapping data between the plurality of memory devices based on the changed mapping, and
   a state manager for determining a state of the memory system depending on whether the data swapper is swapping the data or has completed swapping the data, and providing the remap manager with the trigger based on the state of the memory system and a difference in a degree of wear between the plurality of memory devices, wherein the remap manger changes the mapping between the logical addresses and the cores by swapping a logical address mapped to a core that controls a memory device having the lowest degree of wear, among the plurality of memory devices, for a logical address mapped to a core having the highest number of requests in a recent period of time among the plurality of cores.

9. The memory system of claim 8, wherein the remap manager determines the degree of wear for each memory device based on a cumulative erase count of each of the memory devices, and determines a recent request throughput for each core based on a recent erase count of each of the memory devices.

10. A controller that provides a request of a host to one or more of a plurality of cores controlling respective memory devices, the controller comprising:
    a host interface layer suitable for providing any one of the cores with the request based on mapping between logical addresses and the cores;
    a remap manager suitable for changing the mapping between the logical addresses and the cores in response to a trigger;
    a data swapper suitable for swapping data between the memory devices, which correspond to the cores based on the changed mapping; and
    a state manager suitable for determining a state of the controller depending on whether the data swapper is swapping the data or has completed swapping the data, and providing the remap manager with the trigger based on the state of the controller and a difference in a degree of wear between the memory devices, wherein the state manager determines the state of the controller as a remap verification state when the data swapper completes the swapping of the data, and provides the remap manager with the trigger when the difference in the degree of wear increases within a set time range of the remap verification state.

11. The controller of claim 10, wherein the state manager provides the remap manage with the trigger when the difference in the degree of wear is equal to or greater than a trigger threshold value in an idle state of the controller.

12. The controller of claim 11, wherein the state manager changes the remap verification state to the idle state when the difference in the degree of wear is less than a success threshold value, which is lower than the trigger threshold value, in the remap verification state.

13. The controller of claim 10, further comprising a monitor suitable for monitoring the degrees of wear of the respective memory devices,
   wherein the state manager determines the state of the controller as a data swap state while the data swapper is swapping the data, deactivates the monitor in the data swap state, and activates the monitor in the remap verification state.

14. The controller of claim 10, wherein the difference in the degree of wear is a difference in the degree of wear between a memory device having the highest degree of wear and a memory device having the lowest degree of wear among the plurality of memory devices.

15. The controller of claim 10, wherein the remap manager changes the mapping between the logical addresses and each of the cores by swapping a logical address mapped to a core that controls a memory device having the lowest degree of wear, among the plurality of memory devices, for a logical address mapped to a core that controls a memory device having the highest rate of increase in the degree of wear among the plurality of memory devices.

16. The controller of claim 10, wherein the remap manger changes the mapping between the logical addresses and each of the cores by swapping a logical address, mapped to a core that controls a memory device having the lowest degree of wear, among the plurality of memory devices, for a logical address mapped to a core having the highest number of requests in recent period of time among the plurality of cores.

17. The controller of claim 16, wherein the remap manager determines the degree of wear for each memory device based on a cumulative erase count of each of the memory devices, and determines a recent request throughput for each core based on a recent erase count of each of the memory devices.

* * * * *